(12) United States Patent
Jee et al.

(10) Patent No.: US 7,426,984 B2
(45) Date of Patent: Sep. 23, 2008

(54) TORSIONAL VIBRATION DAMPER

(75) Inventors: Tae Han Jee, Suwon (KR); Jae Hoon Jung, Seongnam (KR); Young Rae Song, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/200,778

(22) Filed: Aug. 9, 2005

(65) Prior Publication Data

US 2006/0032717 A1     Feb. 16, 2006

(30) Foreign Application Priority Data

Aug. 11, 2004   (KR) .................... 10-2004-0063309

(51) Int. Cl.
*F16F 11/00*      (2006.01)
*F16D 3/12*       (2006.01)

(52) U.S. Cl. ................. 188/381; 464/68; 464/62.1; 464/64.1; 192/70.17; 192/213; 192/214

(58) Field of Classification Search ............... 464/62.1, 464/64.1, 68.4, 68.41, 68.92; 192/213, 213.3, 192/214, 214.1; 188/379–381, 267, 201, 188/203, 205
See application file for complete search history.

(56) References Cited

U.S. PATENT DOCUMENTS

| | | | | |
|---|---|---|---|---|
| 5,025,680 A | * | 6/1991 | Umeyama et al. | 464/68.41 |
| 5,052,244 A | * | 10/1991 | Kamiya et al. | 464/68.41 |
| 5,289,737 A | | 3/1994 | Kuhne | |
| 5,307,710 A | * | 5/1994 | Feldhaus et al. | 464/68.3 |
| 5,377,560 A | | 1/1995 | Schierling et al. | |
| 6,416,416 B1 | * | 7/2002 | Rohs et al. | 464/68.41 |
| 6,575,838 B2 | * | 6/2003 | Jackel et al. | 464/68.92 |
| 2002/0128074 A1 | | 9/2002 | Jackel et al. | |

FOREIGN PATENT DOCUMENTS

| | | |
|---|---|---|
| DE | 199 58 813 A1 | 12/2000 |
| EP | 0 478 106 A2 | 4/1992 |
| EP | 1 231 406 A2 | 8/2002 |
| EP | 1 460 304 A1 | 9/2004 |
| KR | 1020040037781 A | 5/2004 |

* cited by examiner

*Primary Examiner*—Robert A. Siconolfi
*Assistant Examiner*—Mahbubur Rashid
(74) *Attorney, Agent, or Firm*—Morgan Lewis & Bockius LLP

(57) ABSTRACT

A torsional vibration damper includes: a primary mass defining a substantially, ring-shaped chamber that is divided into at least two portions; a secondary mass relatively rotatably connected to the primary mass; and a plurality of damping units disposed in the divided portion of the ring-shaped chamber for coupling the primary and secondary masses to each other in a rotatable elastic manner. Each of the damping units includes a plurality of coil springs, and outer and inner wedge-shaped friction guides. The coil springs are situated in series and disposed one after the other within the divided portions of the ring-shaped chamber. The outer and inner wedge-shaped friction guides face each other along facing surfaces thereof. Each of the facing surfaces of the outer and inner wedge-shaped friction guides are entirely slanted with respect to a radial direction of the primary mass.

6 Claims, 7 Drawing Sheets

TORSIONAL VIBRATION DAMPER

CROSS REFERENCE TO RELATED APPLICATION

This application claims priority to Korean Application No. 10-2004-0063309, filed on Aug. 11, 2004, and the disclosure of which is incorporated herein by reference in its entirety.

FIELD OF THE INVENTION

Generally, the present invention relates to a torsional vibration damper for a vehicle.

BACKGROUND OF THE INVENTION

A torsional vibration damper, i.e., a dual mass flywheel, is generally used for damping a torsional vibration that is generated from the transmission of power between an output shaft of an engine and an input shaft of a transmission. Typically, torsional vibration dampers include a first mass, a second mass, and a damping unit disposed between the first and second masses. The first mass is connected to the output shaft of the engine, and the second mass is connected to the input shaft of the transmission through a clutch mechanism.

Generally, a ring-shaped chamber is formed in the first mass, and the damping unit is disposed within the ring-shaped chamber. In particular, the damping unit is disposed within the ring-shaped chamber such that it can be compressed by the first and second masses in response to a relative rotation between the first and second masses.

The damping unit includes: a plurality of coil springs that are situated in series and disposed one after the other within the ring-shaped chamber; and at least one friction member that is slidably disposed between neighboring coil springs and configured to be rubbed against an inner surface of the ring-shaped chamber. In the case of a wedge-shaped friction member, the friction member may include an inner wedge-shaped friction member and an outer wedge-shaped friction member.

The ring-shaped chamber is filled with lubrication oil for lubrication of the inner surface of the ring-shaped chamber.

In the conventional torsional vibration damper, friction between the outer and inner wedge-shaped friction members is allowed within a limited range, and therefore good damping characteristics cannot be achieved. In addition, while the coil spring is returned to its original state from a compressed state, the inner and outer wedge-shaped friction members can be deviated from each other, and this may cause the torsional vibration damper to deteriorate.

The information disclosed in this section is only for enhancement of understanding of the background of the invention and should not be taken as an acknowledgement or any form of suggestion that this information forms the prior art that is already known in this country to a person of ordinary skill in the art.

SUMMARY OF THE INVENTION

The present invention provides a torsional vibration damper having improved damping characteristics and minimal separation of the outer and inner wedge-shaped friction guides from each other while the torsional vibration damper rotates.

According to an embodiment of the present invention, an exemplary torsional vibration damper includes a primary mass, a secondary mass, and a damping unit. The primary mass is adapted to be coupled to an engine crankshaft for rotation about a rotational axis of the engine crankshaft, and defines a substantially ring-shaped chamber that is divided into at least two portions. The secondary mass is relatively rotatably connected to the primary mass and connectable with a clutch. The damping unit couples the primary and secondary masses to each other in a rotatable elastic manner. The damping unit includes a plurality of coil springs, a pair of end guides, and outer and inner wedge-shaped friction guides. The coil springs are situated in series and disposed one after the other within the divided portions of the ring-shaped chamber. The pair of end guides are slidably disposed within each divided portion of the ring-shaped chamber and support outer ends of the coil springs among the plurality of elastic members. The outer and inner wedge-shaped friction guides are slidably disposed between neighboring coil springs and configured to be rubbed against at least one of an inner wall and an outer wall of the ring-shaped chamber in response to compressions of the coil springs such that a friction force is generated in response to a relative rotation between the primary and secondary masses. The outer and inner wedge-shaped friction guides face each other along facing surfaces thereof. Each of the facing surfaces of the outer and inner wedge-shaped friction guides are entirely slanted with respect to a radial direction of the primary mass.

A radial thickness of the inner wedge-shaped friction guide may be less than that of the outer wedge-shaped friction guide.

In another embodiment, a torsional vibration damper includes: a primary mass defining a substantially ring-shaped chamber that is divided into at least two portions; a secondary mass relatively rotatably connected to the primary mass; and a plurality of damping units disposed in the divided portion of the ring-shaped chamber for coupling the primary and secondary masses to each other in a rotatable elastic manner. Each of the damping units includes a plurality of coil springs and outer and inner wedge-shaped friction guides. The coil springs are situated in series and disposed one after the other within the divided portions of the ring-shaped chamber. The outer and inner wedge-shaped friction guides are slidably disposed between neighboring coil springs and configured to be rubbed against at least one of an inner wall and an outer wall of the ring-shaped chamber in response to compressions of the coil springs such that a friction force is generated in response to a relative rotation between the primary and secondary masses. The outer and inner wedge-shaped friction guides face each other along facing surfaces thereof. Each of the facing surfaces of the outer and inner wedge-shaped friction guides are entirely slanted with respect to a radial direction of the primary mass.

In a further embodiment, a radial thickness of the inner wedge-shaped friction guide may be less than that of the outer wedge-shaped friction guide.

In another further embodiment, a torsional vibration damper includes: a primary mass adapted to be coupled to an engine crankshaft for rotation about a rotational axis of the engine crankshaft, in which the primary mass defines a substantially ring-shaped chamber that is divided into at least two portions; a secondary mass relatively rotatably connected to the primary mass and connectable with a clutch; and a damping unit for coupling the primary and secondary masses to each other in a rotatable elastic manner. The damping unit includes: a plurality of coil springs situated in series and disposed one after the other within the divided portions of the ring-shaped chamber; a pair of end guides slidably disposed within each divided portion of the ring-shaped chamber and supporting outer ends of the coil springs among the plurality of elastic members; and outer and inner wedge-shaped friction guides slidably disposed between neighboring coil springs and configured to be rubbed against at least one of an inner wall and an outer wall of the ring-shaped chamber in response to compressions of the coil springs such that a friction force is generated in response to a relative rotation between the primary and secondary masses, the outer and inner wedge-shaped friction guides facing each other along facing surfaces thereof. Each of the facing surfaces of the outer and inner wedge-shaped friction guides is slanted with respect to a radial direction of the primary mass. A groove is formed on one of the facing surfaces of the inner and outer wedge-shaped friction guides, and a protrusion that is able to be fitted into the groove is formed on the other of the facing surfaces of the inner and outer wedge-shaped friction guides.

Each of the facing surfaces of the outer and inner wedge-shaped friction guides is entirely slanted with respect to a radial direction of the primary mass.

In yet another embodiment, a torsional vibration damper includes: a primary mass defining a substantially ring-shaped chamber that is divided into at least two portions; a secondary mass relatively rotatably connected to the primary mass; and a plurality of damping units disposed in the divided portion of the ring-shaped chamber for coupling the primary and secondary masses to each other in a rotatable elastic manner. Each of the damping units includes: a plurality of coil springs situated in series and disposed one after the other within the divided portions of the ring-shaped chamber; and outer and inner wedge-shaped friction guides slidably disposed between neighboring coil springs and configured to be rubbed against at least one of an inner wall and an outer wall of the ring-shaped chamber in response to compressions of the coil springs such that a friction force is generated in response to a relative rotation between the primary and secondary masses, the outer and inner wedge-shaped friction guides facing each other along facing surfaces thereof. Each of the facing surfaces of the outer and inner wedge-shaped friction guides is slanted with respect to a radial direction of the primary mass. A groove is formed on one of the facing surfaces of the inner and outer wedge-shaped friction guides, and a protrusion that is able to be fitted into the groove is formed on the other of the facing surfaces of the inner and outer wedge-shaped friction guides.

BRIEF DESCRIPTION OF THE DRAWINGS

The accompanying drawings illustrate exemplary embodiments of the present invention, and, together with the description, serve to explain the principles of the present invention, wherein.

DETAILED DESCRIPTION OF THE EMBODIMENTS

An embodiment of the present invention will be described hereinafter in detail with reference to the accompanying drawings.

Figure 1:
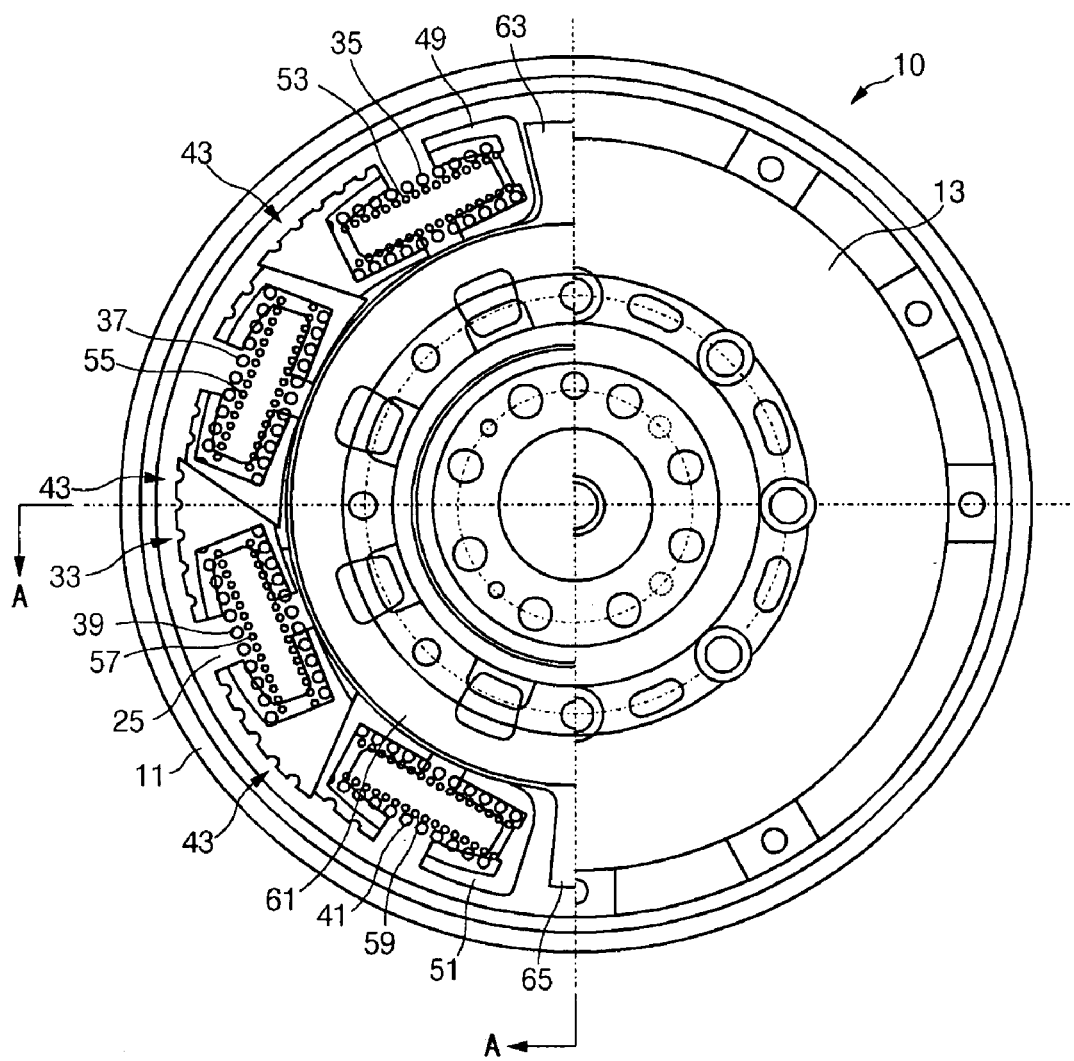
FIG. 1 is a partially broken-away plan view showing an inner structure of a torsional vibration damper according to an embodiment of the present invention.
Figure 2:
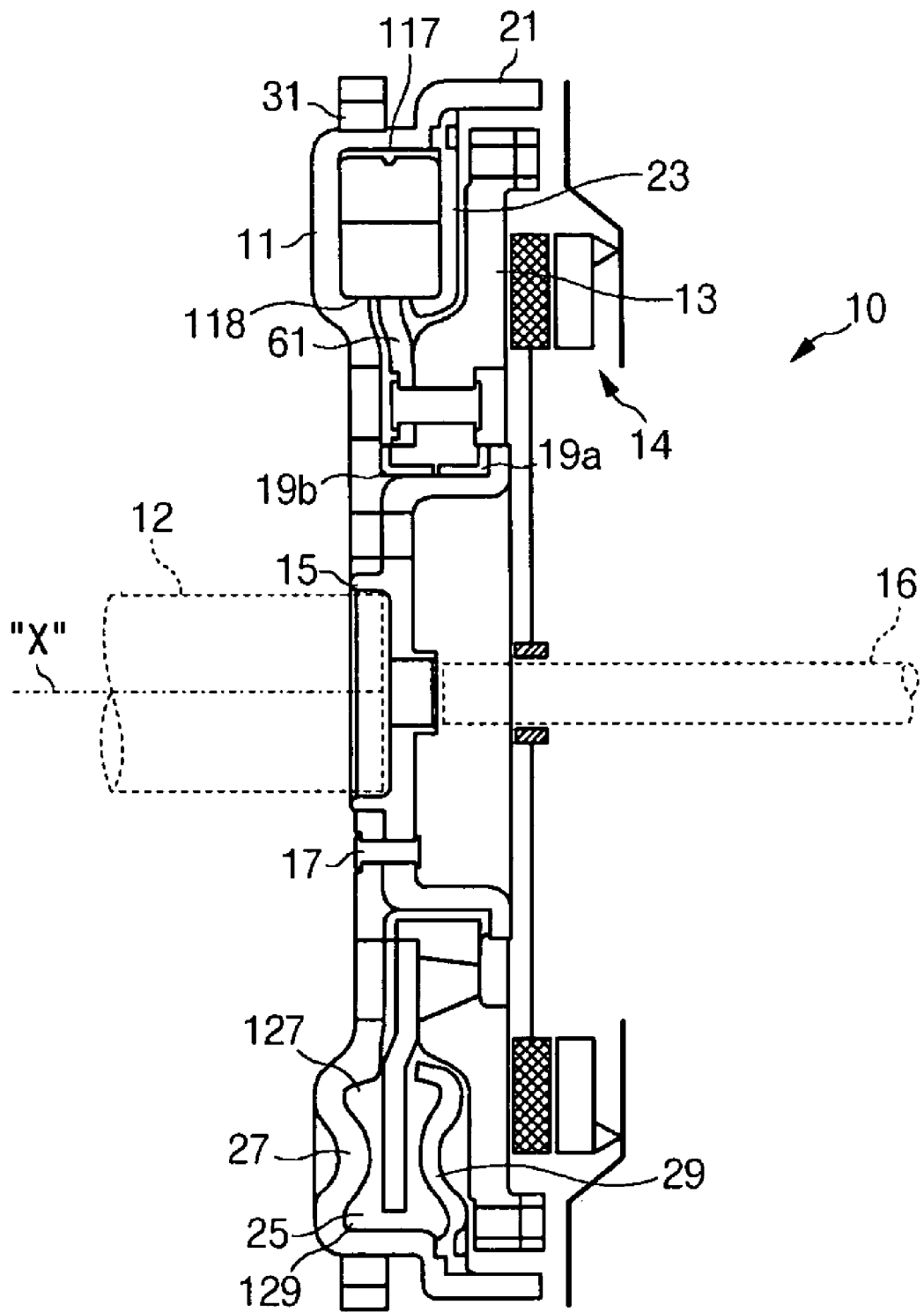
FIG. 2 is a sectional view approximately along line A-A in FIG. 1.

As shown in FIGS. 1 and 2, a torsional vibration damper 10 according to an embodiment of the present invention includes a primary mass 11, a secondary mass 13, and a damping unit 33. The torsional vibration damper 10 may be disposed between an engine (not shown) and a transmission (not shown), and functions to dampen torsional vibration that is generated during power transmission. The torsional vibration damper 10 can be used between any power transmission portions, in addition to portions between the engine and the transmission.

The primary mass 11 is adapted to be coupled to an engine crankshaft 12 for rotation about a rotational axis "X" of the engine crankshaft 12. The secondary mass 13 is relatively rotatably connected to the primary mass 11 and is configured to be connectable with a clutch 14. A hub 15 is coupled to a center portion of the primary mass 11 through a rivet (or a bolt) 17, and the secondary mass 13 is rotatably connected to the hub 15 through a pair of bushings 19a and 19b. Thus, the secondary mass 13 is rotatably connected to the primary mass 11. The primary and secondary masses 11 and 13 may be connected to each other through two bushings 19a and 19b. Therefore, torsional stress acting on each of the bushings 19a and 19b is decreased so that distortion of the bushings 19a and 19b can be minimized.

As shown in FIGS. 1 and 2, the primary mass 11 can have a shape of a circular plate, although it will be appreciated by one of ordinary skill in the art that the masses can be of any appropriate shape. The primary mass 11 defines a substantially ring-shaped chamber 25. A folded edge portion 21 is provided around the edge of the primary mass 11, and a cover 23 is coupled to the edge portion 21, thereby defining the ring-shaped chamber 25. One of ordinary skill in the art can appreciate that the ring-shaped chamber can be defined in any other way.

The ring-shaped chamber 25 may be divided into at least two portions. For example, the ring-shaped chamber can be divided into at least two portions by a first protrusion 27 formed on the primary mass 11 and/or a second protrusion 29 formed on the cover 23. Although the ring-shaped chamber 25 is divided into two portions in FIG. 2, it will be appreciated by one of ordinary skill in the art that the ring-shaped chamber 25 can be divided into more than two portions.

The ring-shaped chamber 25 may be at least partially filled with lubrication oil. The first and second protrusions 27 and 29 may be formed near a radial center portion of the ring-shaped chamber 25, so that lubrication oil passages 127 and 129 are formed on both sides of the first and second protrusions 27 and 29. Thus, the divided portions of the ring-shaped chamber 25 can be connected via the lubrication oil passages 127 and 129. The lubrication oil can move between the divided portions of the ring-shaped chamber 25 through the lubrication oil passages 127 and 129, so that lubrication oil can be prevented from gathering in one of the divided portions.

A ring gear 31 is formed in an outer circumference of the primary mass 11. The ring gear 31 is for connection with a start motor. A damping unit 33 is disposed in each divided portion of the ring-shaped chamber 25. The damping unit 33 is supported by the first and/or second protrusions 27 and 29. The damping unit 33 couples the primary and secondary masses 11 and 13 to each other in a rotatable elastic manner.

The damping unit 33, which elastically connects the primary and secondary masses 11 and 13 to each other, is disposed in each of the divided portions of the ring-shaped chamber 25. The damping unit 33 is disposed in the divided portion of the ring-shaped chamber 25 in a state that it is supported by the first protrusion 27 and/or the second protrusion 29. Hereinafter, the divided portions of the ring-shaped chamber 25 are simply referred to as the ring-shaped chamber.

Referring again to FIG. 1, the damping unit 33 includes a plurality of coil springs 35, 37, 39, and 41, and a friction member 43 that is disposed between the coil springs 35, 37, 39, and 41. The coil springs 35, 37, 39, and 41 are situated in series and disposed one after the other within the ring-shaped chamber 25. In an alternative embodiment, other suitable elastic members that can be compressed and provide an elastic force can be used in place of the coil springs, as one of ordinary skill in the art will appreciate. The damping unit 33 may further include a pair of end guides 49 and 51 that are slidably disposed within the ring-shaped chamber 25 and respectively support outer ends of the end coil springs 35 and 41 among the coil springs 35, 37, 39, and 41.

The damping member 43 has a direct effect on the damping characteristics of the damping unit 33, so it can be referred to as a hysteresis member.

The end guides 49 and 51 are supported by the first and second protrusions 27 and 29.

Figure 10:
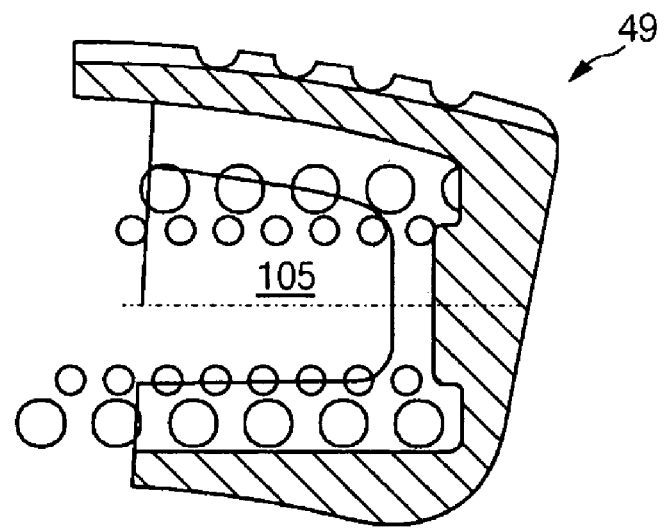
FIG. 10 is a sectional view of an end guide of the torsional vibration damper according to an embodiment of the present invention.

As shown in FIG. 10, a coil spring receiving hole 105 is formed in the end guide 49. The plurality of coil springs 35, 37, 39, and 41 are situated in series between the end guides 49 and 51.

As shown in FIG. 1, a plurality of auxiliary coil springs 53, 55, 57, and 59 may be respectively disposed within the coil springs 35, 37, 39, and 41. Due to the auxiliary coil springs 53, 55, 57, and 59, sequential damping can be achieved.

The friction member 43 is slidably disposed between neighboring coil springs, e.g., 37 and 39, and is configured to be rubbed against at least one of an inner wall 118 and an outer wall 117 of the ring-shaped chamber 25 in response to compressions of the coil springs such that the friction force is generated in proportion to a relative rotation between the primary and secondary masses 11 and 13, and to a rotational speed thereof.

Figure 3:
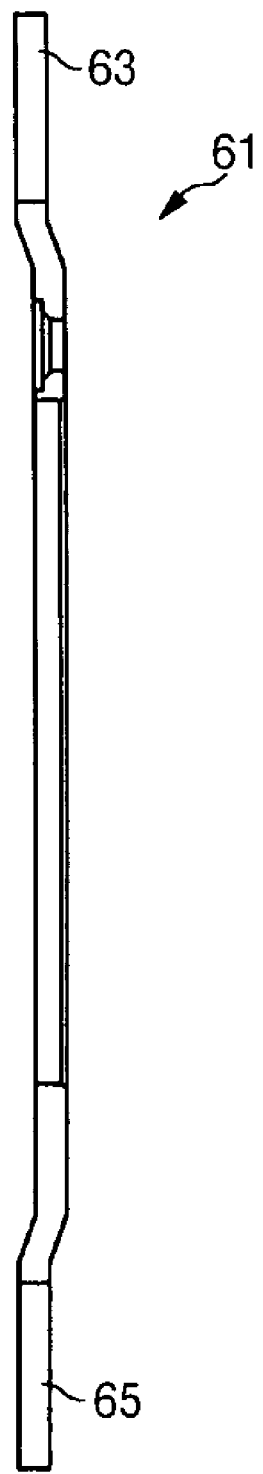
FIGS. 3 and 4 are side views of a drive plate of the torsional vibration damper according to an embodiment of the present invention.
Figure 4:
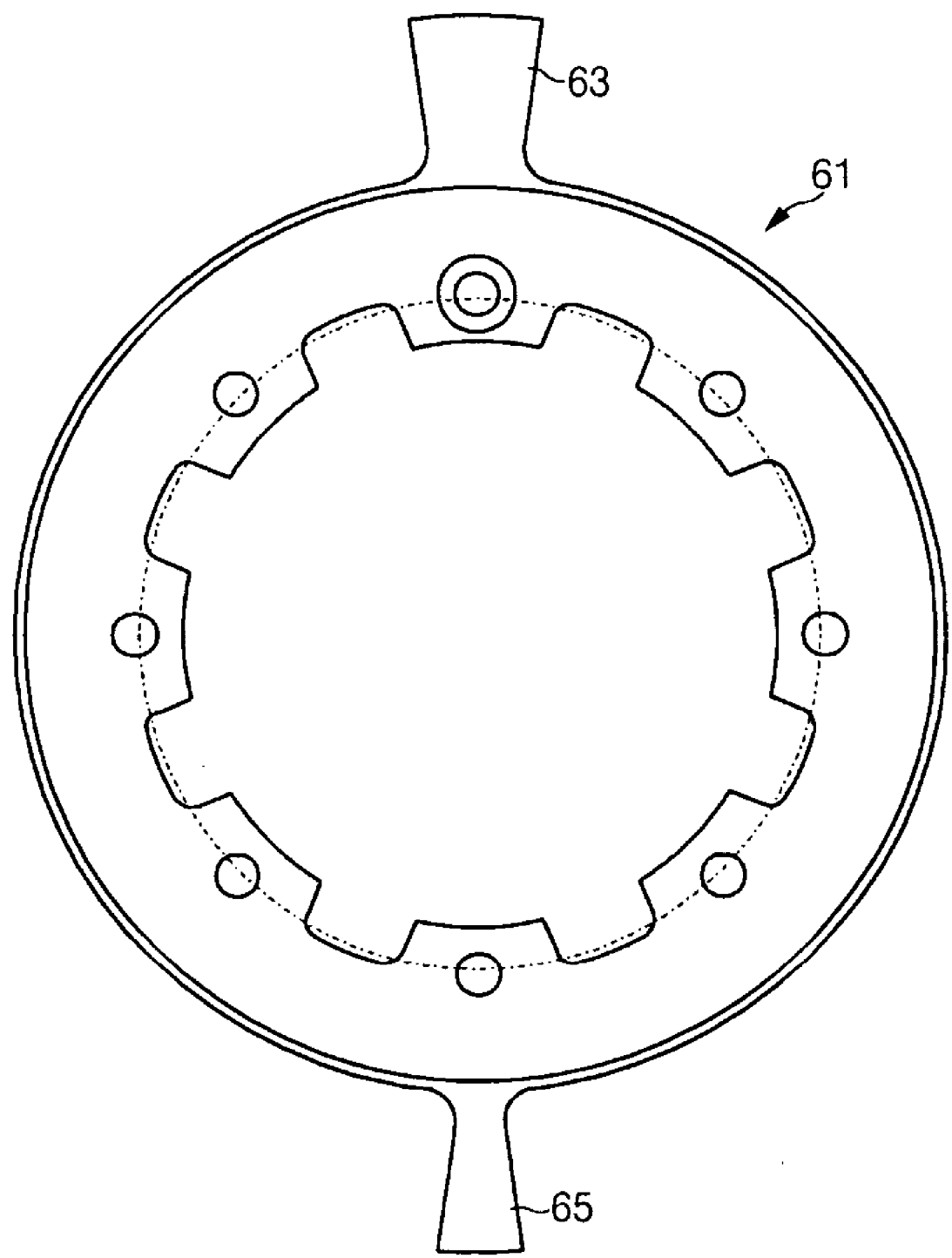

As shown in FIGS. 1 and 2, a drive plate 61 is fixedly coupled to the secondary mass 13, thereby rotating together with the secondary mass 13. The drive plate 61 is configured to compress the damping unit 33 in response to a relative rotation between the primary and secondary masses 11 and 13. As shown in FIGS. 3 and 4, the drive plate 61 may have a ring shape, and first and second compression fins 63 and 65 may be oppositely provided on an outer circumference of the drive plate 61.

At least a portion of each of the compression fins 63 and 65 is positioned within the ring-shaped chamber 25, and has a shape and size that facilitates movement in the ring-shaped chamber 25. In addition, the compression fins 63 and 65 are configured to pass between the first and second protrusions 27 and 29 that divide the ring-shaped chamber 25.

When a power transmission does not occur in the torsional vibration damper 10, the compression fins 63 and 65 are positioned between the first and second protrusions 27 and 29. Meanwhile, while a power transmission occurs in the torsional vibration damper 10, the compression fins 63 and 65 move along the ring-shaped chamber 25 to compress the end guides 49 and 51.

For example, when the drive plate 61 rotates counter clockwise in FIG. 1 with respect to the primary mass 11, the first compression fin 63 compresses the end guide 49, and the second compression fin 65 compresses an end guide 51 that is disposed within the other divided portion of the ring-shaped chamber 25. At this time, the other end guide 51 is supported by the first and second protrusions 27 and 29.

Therefore, the damping unit 33 is compressed by the primary mass 11 and the drive plate 61 in response to the relative rotation between the primary and secondary masses 11 and 13. Consequently, in response to the relative rotation between the primary and secondary masses 11 and 13, the plurality of coil springs 35, 37, 39, and 41 are also compressed. The friction member 43 slides in the ring-shaped chamber 25 as a result of the compression of the coil springs 35, 37, 39, and 41, and the friction member 43 is rubbed against the inner or outer walls 118 and 117 of the ring-shaped chamber 25 to generate a friction force.

Consequently, damping is achieved by the compression of the coil springs 35, 37, 39, and 41 and the friction force generated by the movement of the friction member 43.

As shown in FIG. 4, the first and second compression fins 63 and 65 have different widths, so that the damping units are sequentially compressed. Because the first compression fin 63 has a greater width, it initially compresses one of the damping units. Since the second compression fin 65 has a lesser width, it then compresses the other damping units, so that a two-step damping characteristic can be realized. However, it will be appreciated by one of ordinary skill in the art that a multiple step damping can be realized.

The damping units that are respectively disposed within the divided portions of the ring-shaped chamber 25 are sequentially compressed by the first and second compression fins 63 and 65. This causes a multiple step damping, so that a torsional vibration can be effectively dampened.

Figure 5:
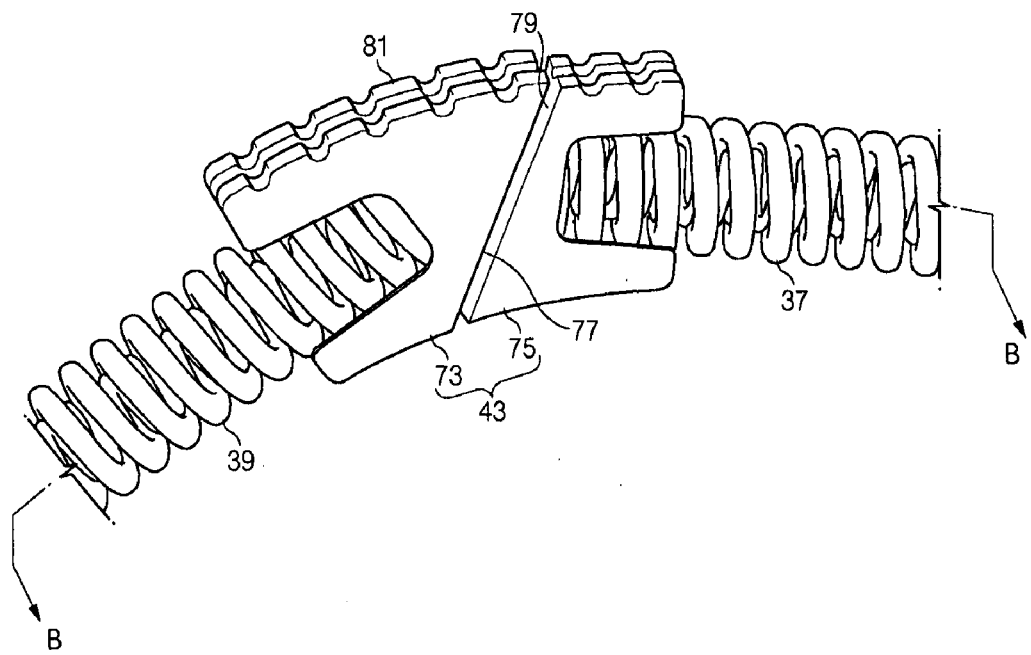
FIG. 5 is a perspective view of a friction member of the torsional vibration damper according to an embodiment of the present invention.

As shown in FIG. 5, the friction member 43 includes an outer wedge-shaped friction guide 73 and an inner wedge-shaped friction guide 75.

Figure 6:
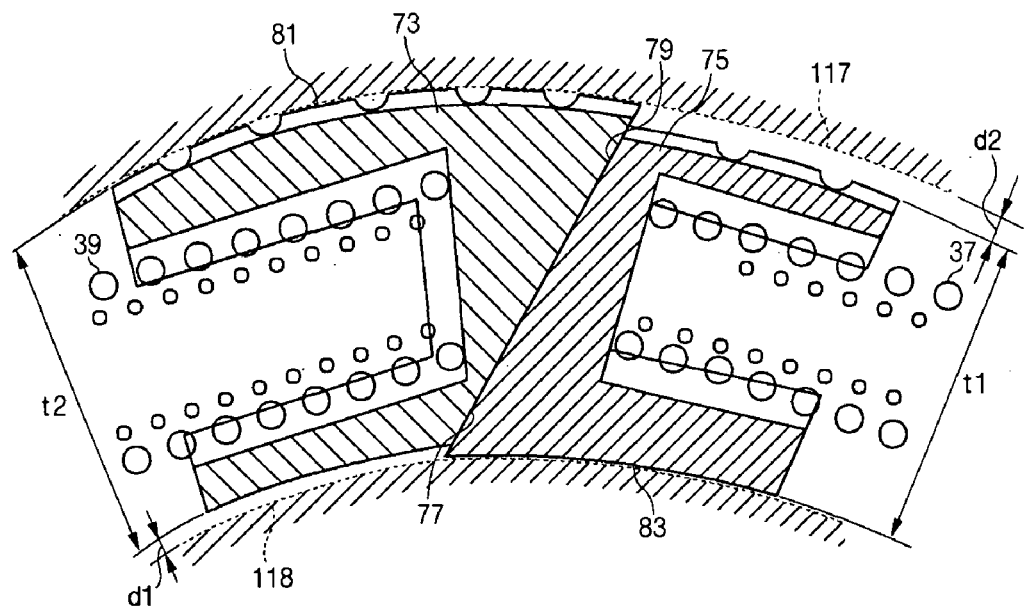
FIG. 6 is a sectional view along a line B-B in FIG. 5.

The outer and inner wedge-shaped friction guides 73 and 75 are slidably disposed to face each other between the neighboring coil springs 37 and 39, and are configured to be rubbed against at least one of an inner wall 118 and an outer wall 117 of the ring-shaped chamber 25 in response to compressions of the coil springs 37 and 39 such that a friction force is generated in response to a relative rotation between the primary and secondary masses 11 and 13. As shown in FIGS. 5 and 6, a slanted surface 77 on the outer wedge-shaped friction guide 73 and a slanted surface 79 on the inner wedge-shaped friction guide 75 face each other.

These surfaces 77 and 79 are formed to be slanted with respect to a radial direction of the primary mass 11, wherein the first slanted surface 77 is formed on the outer wedge-shaped friction element 73, and the second slanted surface 79 is formed on the inner wedge-shaped friction element 75. The outer and inner wedge-shaped friction guides 73 and 75 are disposed such that the first and second slanted surfaces 77 and 79 contact each other. Therefore, when the coil springs 37 and 39 are compressed, the outer wedge-shaped friction guide 73 moves outwardly in a radial direction of the ring-shaped chamber 25, and the inner wedge-shaped friction guide 75 moves inwardly in the radial direction of the ring-shaped chamber 25. Accordingly, an outer circumference 81 of the outer wedge-shaped friction guide 73 is rubbed against the outer wall 117 of the ring-shaped chamber 25, and an inner circumference 83 of the inner wedge-shaped friction guide 75 is rubbed against the inner wall 118 of the ring-shaped chamber 25, thereby generating a friction force for damping torsional vibration.

In this embodiment of the present invention, the facing surfaces 77 and 79 of the outer and inner wedge-shaped friction guides 73 and 75 are entirely slanted with respect to the radial direction of the primary mass 11. In other words, a protrusion for limiting relative movements of the outer and inner wedge-shaped friction guides 73 and 75 is not formed on an outer end of the slanted surface 77 on the outer wedge-shaped friction guide 73 or on an inner end of the slanted surface 79 of the inner wedge-shaped friction guide 75. In the case when a protrusion is formed on the slanted facing surfaces on the outer and inner wedge-shaped friction guides 73 and 75, a moment that urges the friction guides to rotate with respect to the protrusions may occur. In particular, if there is a relatively large moment, the protrusion may be broken. As such, the entire portions of the facing surfaces of the outer and inner wedge-shaped friction guides 73 and 75 are slanted, so that moment due to the protrusion can be prevented. This may substantially increase durability. In addition, the area of the first and second slanted surfaces 77 and 79 increases, so that a friction force between the outer and inner wedge-shaped friction guides 73 and 75 also increases, and this may improve the damping characteristics.

In addition, referring to FIG. 6, by suitably selecting radial thicknesses of the outer and inner wedge-shaped friction guides 73 and 75, hysteresis characteristics can be regulated. The radial thickness t1 of the inner wedge-shaped friction guide 75 is less than the radial thickness t2 of the outer wedge-shaped friction guide 73. If the radial thickness t1 of the inner wedge-shaped friction guide 75 is less than the radial thickness t2 of the outer wedge-shaped friction guide 73, a distance d2 between an outer circumference of the inner wedge-shaped friction guide 75 and the outer wall 117 of the ring-shaped chamber 25 becomes greater than a distance d1 between an inner circumference of the outer wedge-shaped friction guide 73 and the inner wall 118 of the ring-shaped chamber 25.

Because the outer circumference of the outer wedge-shaped friction guide 73 is generally maintained to contact the outer wall 117 of the ring-shaped chamber 25 while the torsional vibration damper rotates, a distance of a possible displacement of the inner wedge-shaped friction guide 75 increases if the distance d2 between the outer circumference of the inner wedge-shaped friction guide 75 and the outer wall 117 of the ring-shaped chamber 25 becomes greater than the distance d1 between the inner circumference of the outer wedge-shaped friction guide 73 and the inner wall 118 of the ring-shaped chamber 25. As the distance of the possible displacement of the inner wedge-shaped friction guide 75 increases, the friction between the outer and inner wedge-shaped friction guides 73 and 75 also increases. Therefore, the damping characteristics can be improved.

Figure 7:
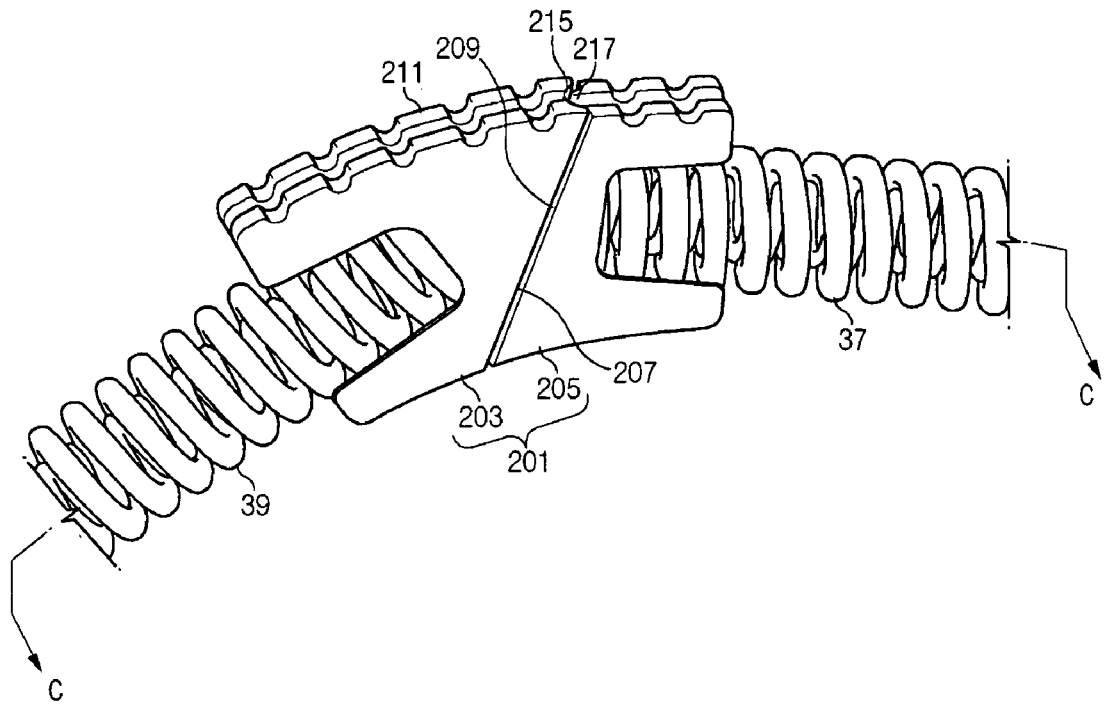
FIG. 7 is a perspective view of a friction member of the torsional vibration damper according to another embodiment of the present invention.
Figure 8:
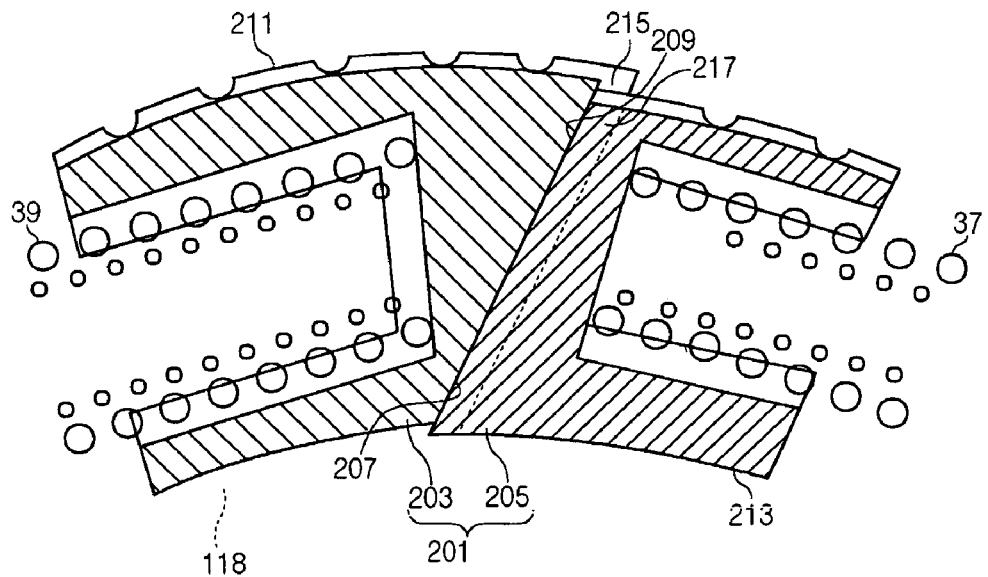
FIG. 8 is a sectional view along a line C-C in FIG. 7.
Figure 9:
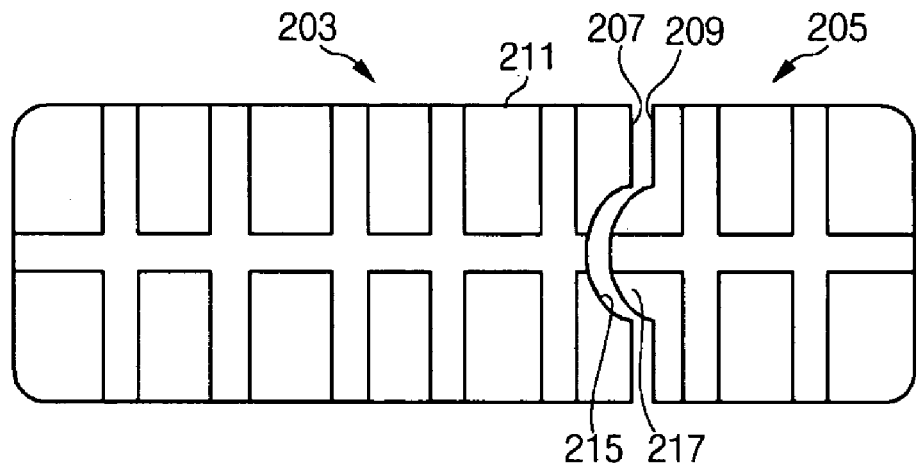
FIG. 9 is a plan view of outer circumferences of an inner wedge-shaped friction guide and an outer wedge-shaped friction guide of the friction member of FIG. 7.

Referring to FIGS. 7 to 9, a friction member 201 according to another embodiment of the present invention will be explained. The friction member 201 includes an outer wedge-shaped friction guide 203 and an inner wedge-shaped friction guide 205. The outer and inner wedge-shaped friction guides 203 and 205 are slidably disposed to face each other between neighboring coil springs 37 and 39, and are configured to be rubbed against at least one of the inner wall 118 and the outer wall 117 of the ring-shaped chamber 25 in response to compressions of the coil springs 37 and 39 such that a friction force is generated in response to a relative rotation between the primary and secondary masses 11 and 13. As shown in FIGS. 7 and 8, a slanted surface 207 on the outer wedge-shaped friction guide 203 and a slanted surface 209 on the inner wedge-shaped friction guide 205 face each other.

These surfaces 207 and 209 of the outer and inner wedge-shaped friction guides 203 and 205, are formed to be slanted with respect to a radial direction of the primary mass 11, wherein the first slanted surface 207 is formed on the outer wedge-shaped friction element 203, and the second slanted surface 209 is formed on the inner wedge-shaped friction element 205. The outer and inner wedge-shaped friction guides 203 and 205 are disposed such that the first and second slanted surfaces 207 and 209 contact each other. Therefore, when the coil springs 37 and 39 are compressed, the outer wedge-shaped friction guide 203 moves outwardly in a radial direction of the ring-shaped chamber 25, and the inner wedge-shaped friction guide 205 moves inwardly in the radial direction of the ring-shaped chamber 25. Accordingly, an outer circumference 211 of the outer wedge-shaped friction guide 203 is rubbed against the outer wall 117 of the ring-shaped chamber 25, and an inner circumference 213 of the inner wedge-shaped friction guide 205 is rubbed against the inner wall 118 of the ring-shaped chamber 25, thereby generating a friction force for damping torsional vibration.

In this embodiment of the present invention, the facing surfaces of the outer and inner wedge-shaped friction guides 203 and 205 are entirely slanted with respect to the radial direction of the primary mass 11. In addition, a groove 215 having a specific sectional shape is formed on the first slanted surface 207 of the outer wedge-shaped friction guide 203 and a protrusion 217 having a specific sectional shape that is able to be fitted into the groove 215 formed on the first slanted surface 207, is formed on the second slanted surface 209 of the inner wedge-shaped friction guide 205. However, in an alternative embodiment of the present invention, a groove may be formed on the slanted surface 209 of the inner wedge-shaped friction guide 205 and the corresponding protrusion may be formed on the slanted surface 207 of the outer wedge-shaped friction guide 203, as one of ordinary skill in the art will appreciate.

Referring to the drawings, the sectional shapes of the groove 215 and the protrusion 217 may have a shape of a half-circle, although one of ordinary skill in the art will appreciate that the sectional shapes of the groove 215 and the protrusion 217 can be of any appropriate shape such as a triangle and a rectangle.

Because the protrusion 217 of the inner wedge-shaped friction guide 205 is fitted into the groove 215 of the outer wedge-shaped friction guide 203, it can prevent the inner wedge-shaped friction guide 205 from being separated from the outer wedge-shaped friction guide 203 while the coil springs 37 and 39 are being compressed.

Furthermore, in this embodiment, a radial thickness of the inner wedge-shaped friction guide 205 is less than a radial thickness of the outer wedge-shaped friction guide 203, so that the damping characteristics can be improved.

While the present invention has been described in connection with the most practical exemplary embodiments, it is to be understood that the present invention is not limited to the disclosed embodiments, but, on the contrary, it is intended to cover various modifications and equivalent arrangements included within the spirit and scope of the appended claims.

According to an embodiment of the present invention, damping can be improved due to an increase of friction between the outer and inner wedge-shaped friction guides. In addition, because the groove and the protrusion are formed on the slanted surfaces of the outer and inner wedge-shaped friction guides, they can minimize the separation of the outer and inner wedge-shaped friction guides from each other while the torsional vibration damper rotates.

What is claimed is:

1. A torsional vibration damper, comprising:
a primary mass adapted to be coupled to an engine crankshaft for rotation about a rotational axis of the engine crankshaft, the primary mass defining a substantially ring-shaped Chamber that is divided into at least two portions;
a secondary mass relatively rotatably connected to the primary mass and connectable with a clutch; and
a damping unit for coupling the primary and secondary masses to each other in a rotatable elastic manner,
wherein the damping unit comprises:
a plurality of coil springs situated in series and disposed one after the other within the divided portions of the ring-shaped chamber,
a pair of end guides slidably disposed within each divided portion of the ring-shaped chamber and supporting outer ends of the coil Springs among the plurality of coil springs; and
at least a pair of first and second wedge-shaped friction guides slidably disposed between neighboring coil springs and configured to be rubbed against at least one of an inner wall and an outer wall of the ring-shaped chamber in response-to compressions of the coil springs such that a friction force is generated in response to a relative rotation between the primary and secondary masses, the first and second wedge-shaped friction guides facing each other along facing surfaces thereof,
wherein each of the facing surfaces of the first and second wedge-shaped friction guides are entirely slanted with respect to a radial direction of the primary mass;
and wherein an overall radial thickness of the second wedge-shaped friction guide is less than that of the first wedge-shaped friction guide.

2. A torsional vibration damper, comprising:
a primary mass defining a substantially ring-shaped chamber that is divided into at least two portions;
a secondary mass relatively rotatably connected to the primary mass; and
a plurality of damping units disposed in the divided portion of the ring-shaped chamber for coupling the primary and secondary masses to each other in a rotatable elastic manner,
wherein each of the damping units comprises:
a plurality of coil springs situated in series and disposed one after the other within the divided portions of the ring-shaped chamber, and
at least a pair of first and second wedge-shaped friction guides slidably disposed between neighboring coil springs and configured to be rubbed against at least one of an inner wall and an outer wall of the ring-shaped chamber in response to compressions of the coil springs such that a friction force is generated in response to a relative rotation between the primary and secondary masses, the first and second wedge-shaped friction guides facing each other along facing surfaces thereof,
wherein each of the facing surfaces of the first and second wedge-shaped friction guides are entirely slanted with respect to a radial direction of the primary mass;
and wherein an overall radial thickness of the second wedge-shaped friction guide is less than that of the first wedge-shaped friction guide.

3. A torsional vibration damper, comprising:
a primary mass adapted to be coupled to an engine crankshaft for rotation about a rotational axis of the engine crankshaft, the primary mass defining a substantially ring-shaped chamber that is divided into at least two portions;
a secondary mass relatively rotatably connected to the primary mass and connectable with a clutch; and
a damping unit for coupling the primary and secondary masses to each other in a rotatable elastic manner,
wherein the damping unit comprises:
a plurality of coil springs situated in series and disposed one after the other within the divided portions of the ring-shaped chamber,
a pair of end guides slidably disposed within each divided portion of the ring-shaped chamber and supporting outer ends of the coil springs among the plurality of coil springs, and
at least a pair of first and second wedge-shaped friction guides slidably disposed between neighboring coil springs and configured to be rubbed against at least one of an inner wall and an outer wall of the ring-shaped chamber in response to compressions of the coil springs such that a friction force is generated in response to a relative rotation between the primary and secondary masses, the first and second wedge-shaped friction guides facing each other along facing surfaces thereof,
wherein each of the facing surfaces of the first and second wedge-shaped friction guides are slanted with respect to a radial direction of the primary mass, a groove is formed on one of the facing surfaces of the first and second wedge-shaped friction guides, and a protrusion that is able to be fitted into the groove is formed on the other of the facing surfaces of the first and second wedge-shaped friction guides;
and wherein an overall radial thickness of the second wedge-shaped friction guide is less than that of the first wedge-shaped friction guide.

4. The torsional vibration damper of claim 3, wherein each of the facing surfaces of the first and second wedge-shaped friction guides is entirely slanted with respect to a radial direction of the primary mass.

5. A torsional vibration damper, comprising:
a primary mass defining a substantially ring-shaped chamber that is divided into at least two portions;
a secondary mass relatively rotatably connected to the primary mass; and
a plurality of damping units disposed in the divided portion of the ring-shaped chamber for coupling the primary and secondary masses to each other in a rotatable elastic manner,
wherein each of the damping units comprises:
a plurality of coil springs situated in series and disposed one after the other within the divided portions of the ring-shaped chamber,
at least a pair of first and second wedge-shaped friction guides slidably disposed between neighboring coil springs and configured to be rubbed against at least one of an inner wall and an outer wall of the ring-shaped chamber in response to compressions of the coil springs such that a friction force is generated in response to a relative rotation between the primary and secondary masses, the first and second wedge-shaped friction guides facing each other along facing surfaces thereof, wherein each of the facing surfaces of the first and second wedge-shaped friction guides is slanted with respect to a radial direction of the primary mass, a groove is formed on one of the facing surfaces of the first and second wedge-shaped friction guides, and a protrusion that is able to be fitted into the groove is formed on the other of the facing surfaces of the first and second wedge-shaped friction guides;

and wherein an overall radial thickness of the second wedge-shaped friction guide is less than that of the first wedge-shaped friction guide.

6. The torsional vibration damper of claim 5, wherein each of the facing surfaces of the first and second wedge-shaped friction guides is entirely slanted with respect to a radial direction of the primary mass.

* * * * *